Oct. 29, 1968     W. K. KOLSTER     3,408,477
DETECTOR AND SYSTEM FOR REMOVING ICE AND SNOW
Filed Feb. 28, 1966
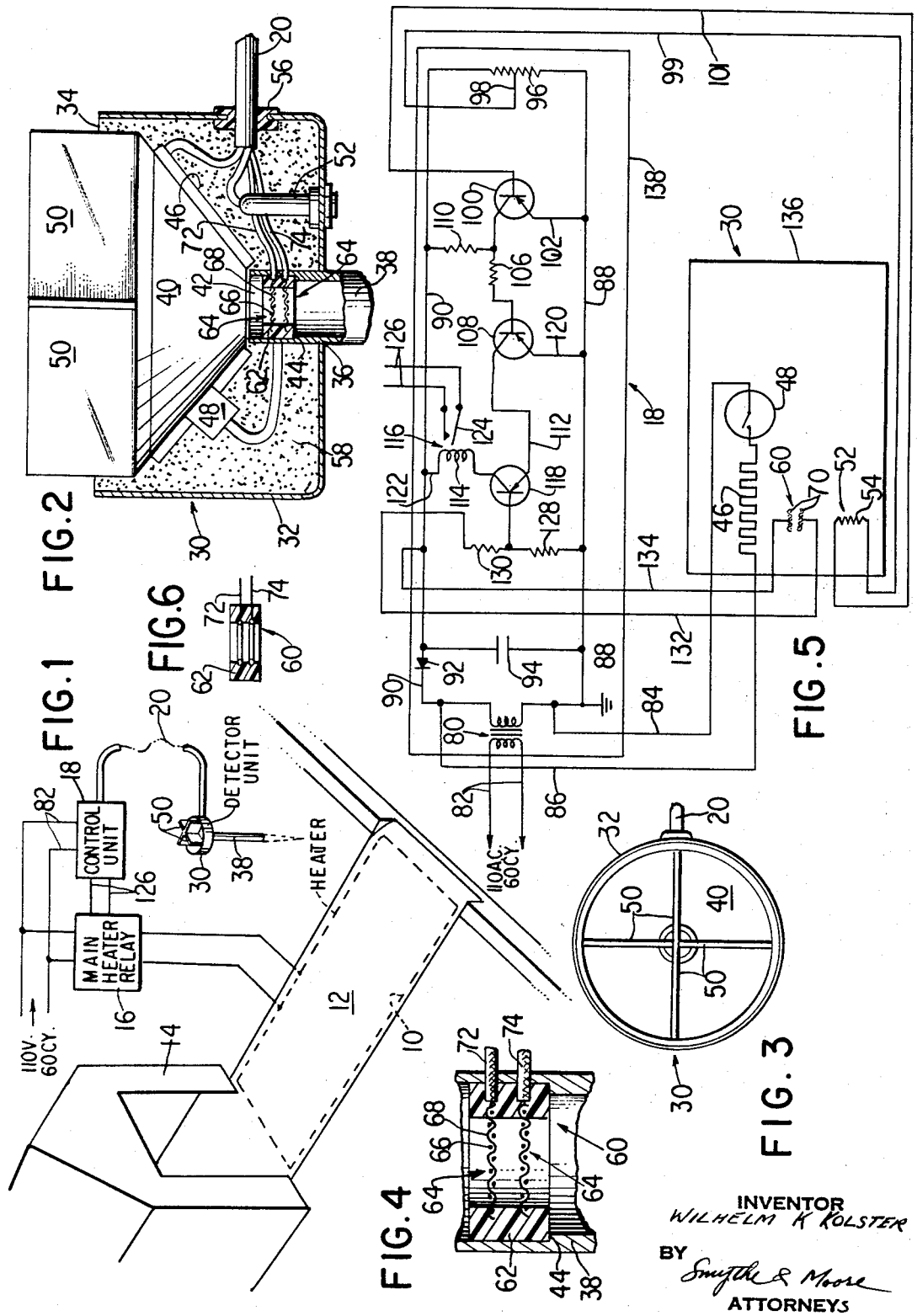
INVENTOR
WILHELM K KOLSTER
BY
Smythe & Moore
ATTORNEYS

United States Patent Office 3,408,477
Patented Oct. 29, 1968

3,408,477
DETECTOR AND SYSTEM FOR REMOVING
ICE AND SNOW
Wilhelm K. Kolster, Michigan City, Ind., assignor to
Swiss Controls & Research, Inc., Michigan City,
Ind., a corporation of Illinois
Filed Feb. 28, 1966, Ser. No. 530,625
11 Claims. (Cl. 219—200)

This invention relates to ice and snow detectors, and more particularly to a detector and system for detecting the presence of ice and snow accumulating on an exposed surface such, for example, as a driveway, walkway or the like, and for operating a heating means for melting such accumulation.

Various devices and systems have been devised for accomplishing the above result, and one such system is shown in U.S. Patent No. 3,164,820 to Hulett. The present invention differs from this patent and other prior devices, however, in that the control system, in addition to the usual moisture and temperature sensors, requires only one relay, two electronic valves and a single amplifier. Also, the present invention obviates the need of a bridge which must be balanced and maintained in balance to avoid giving a false signal. This latter feature is of particular importance where the detector and its associated control system operate a heating means rather than merely an indicator as in Hulett. The present invention also differs from Hulett and other prior devices in the particular construction of the detector device or unit and in the moisture sensor.

An object of the present invention is to provide a system for detecting and removing ice and snow accumulating on an exposed surface which is simple and reliable in operation and requires fewer electrical parts than previous systems of this character.

A further object of the invention is to provide a novel moisture sensor and a new and improved construction for an ice and snow detector to be used in the above system.

More specifically, the present invention provides a temperature responsive sensor such as a thermistor sensitive to ambient temperature, a moisture responsive sensor sensitive to melted ice and snow, a relay for operating a driveway heater or the like, and a pair of electronic valves for controlling operation of said relay. Each of said valves may have a different one of said sensors operatively associated therewith whereby upon a predetermined drop in outside temperature and a predetermined accumulation of moisture, both valves are rendered conductive to energize the relay. Upon a rise temperature above freezing, or upon cessation of the accumulation of moisture, one or the other of said relays is rendered non-conductive and the relay is de-energized. In the illustrated and preferred embodiment, the two sensors are contained in a detector unit and the remainder of the control system is contained in a control unit. The temperature sensor is mounted in a protective housing, and a surface having a thermostatically controlled heater associated therewith is provided in the housing to collect and melt ice and snow and feed the melted product to the moisture responsive sensor. The electronic valves preferably are solid state devices.

These and other objects and advantages of the invention will be apparent from the following description and accompanying drawing which are merely exemplary.

In the drawing:

FIG. 1 is a schematic view of the invention as applied for purpose of illustration to an electric heater for a garage driveway;

FIG. 2 is a transverse sectional view of the detector unit and novel moisture sensor, with certain parts shown in elevation;

FIG. 3 is a top plan view of the detector unit shown in FIG. 2;

FIG. 4 is an enlarged sectional view of the moisture sensor;

FIG. 5 is a wiring diagram of the control system operated by the detector of FIGS. 1 and 2; and FIG. 6 is an enlarged fragmentary view of another form of the sensor.

Referring to FIG. 1 of the drawings, the invention is illustrated as being utilized to control the operation of an electric heating element 10 embedded in the driveway 12 of a garage 14 and operated from a power source (not shown) by a conventional relay switch indicated generally by block 16. It will be evident, however, that the heater 10 could comprise any desired type of heating means such as hot water circulating through pipes and heated by electricity or gas under control of a relay switch or valve operated by the detector system of the invention. It will also be apparent that the heater 10 could be associated with any desired exposed surface such as a walkway or the reflector of an electronic telescope. The power relay 16 is operated by a control unit 18 (to be described later) connected by cable 20 to the detector unit 30.

As shown in FIGS. 2 and 3, the detector 30 in its preferred embodiment comprises a protective casing or housing 32 made of a suitable weather-resistant or weather-proofed material and provided with an open top 34 and a centrally located moisture draining aperture or opening 36 in its bottom through which the upper end of a hollow supporting pipe or standard 38 extends. Suitably mounted on the upper end of pipe or standard 38 and extending toward the open top of housing 32 is a frustro-conical or funnel-shaped member or collector 40 made of weather-resistant sheet metal or the like. The member 40 has a smooth upper or exposed surface to facilitate the drainage of moisture (more particularly melted ice or snow) into the open end 42 of the pipe 38. The upper end of pipe or standard 38 is counterbored a sufficient distance to provide a ledge or seat 44 for supporting a moisture responsive sensor 60 hereinafter more fully described.

Mounted on the convex lower surface of the funnel or collector member 40 and in heat-conducting relationship therewith is a heater unit 46 which may be of the film type, and is adapted to melt ice or snow collecting on the funnel member. Also carried by the under or convex side of the funnel 40 and protected by housing 32 is a conventional thermostatic switch 48 adapted to close and open the circuit to heater 46, the switch being set to close at a temperature of 32–35° F. and to open at a temperature of 55–60° F.

Also mounted on the funnel 40 at its upper or exposed end are a plurality of deflectors or vanes 50 which extend transversely of the open end of the funnel, as shown in FIG. 3, and vertically upward beyond or above the open upper top 34 of the housing 32, as shown in FIGS. 1 and 2. The deflectors or vanes 50 may be attached to the upper edge or rim of the funnel member 40, or to the housing 32, by any suitable means such as spot welding. The deflectors 50 serve to deflect snow or freezing moisture onto the funnel-shaped collector surface, especially when a wind is present with the snow or moisture.

A temperature responsive sensor 52, which in the illustrated embodiment comprises a thermistor element 54 mounted in a metallic sheath or housing and adapted to decrease its resistance upon increase in temperature, is also mounted within and protected by the housing 32 as shown in FIG. 2. Cable 20 connecting the detector unit 30 to the control unit 18 and carrying all of the leads to the heater 46, thermostat 48, temperature sensor 52 and moisture sensor 60 enters through a suitable insulated opening 56 in the side wall of housing 32. The entire space between the funnel or collector member 40 and the housing 32 is preferably filled with a suitable electrically insulating, heat conductive material 58 as shown in FIG. 2. Since the material 58, which may be in the form of "Silastic" made by Dow Corning, or the like, is heat conductive to permit operation of the temperature sensitive sensor 52 in response to changes in the outside ambient temperature, it will be evident that a layer of heat insulating material (not shown) may be placed on the underside of heater 46 to prevent interference with the operation of sensor 52. While the pipe or standard 38 is shown as extending upwardly into housing 32 to support the collector or funnel-shaped member 40 and the moisture sensor 60, it will also be evident that a stub pipe ending substantially flush with the bottom of housing 32 could be substituted for the upper portion of the standard, or this stem portion of the funnel could be made integral with the collector surface 40 of the funnel. The detector unit could then rest directly on the ground or other moisture absorbing media, or a hollow standard could be attached to such stem portion.

As shown in FIG. 2, the moisture responsive sensor 60 comprises an annular ring 62 of molded insulating material or the like which supports a pair of spaced apart disc-like members 64 extending across the opening of the ring. Each of the disc-like members 64 comprises a sheet 66 of net material such as nylon net having a plurality of electrically conducting wires 68 interwoven therein to provide a screen-like or grid-like elctrode 70. The electrodes 70 are electrically connected to lead wires 72 and 74, respectively, which pass through suitable openings in the funnel stem portion and connect with the control unit 18 through cable 20. The outside diameter and the thickness of the ring 62 are such that the sensor fits within the upper counterbored portion of the funnel stem pipe and rests on the ledge or seat 44. The spacing between the parallel horizontally disposed discs 64 is such that a desired amount of water (melted ice or snow) must accumulate and pass therebetween before a circuit is closed between the electrodes 70. While the disc-like members 64 forming the electrodes 70 may merely comprise wire screens, it is preferable to interweave the grid or screen wires into a nylon or like net to add strength and assist in retaining water therebetween.

The control circuit or wiring diagram for operating the main heater relay 16 is illustrated in FIG. 1 of the drawing. Referring to FIG. 5, power for the control circuit is supplied by a conventional step-down transformer 80 having its primary connected to a suitable power source by leads 82. The heater 46 and thermostat 48 of the detector unit are connected in series directly across the secondary of the transformer 80 by leads 84 and 86, whereby when the thermostat 48 closes, power is supplied to heater 46, and when the thermostat opens, the heater is disconnected. A lead 88 which may be grounded and a lead 90 connect the transformer secondary to the remainder of the control system through a rectifier 92 bridged by a smoothing condenser 94 to provide power for the system.

A resistance type potentiometer 96 is connected across the power leads 88 and 90 as shown at the right in FIG. 5, and the thermistor element 54 of temperature responsive sensor 52 is connected in series with the movable contact 98 of potentiometer 96 and the control or base electrode of a PNP transistor or electronic valve 100 by leads 99 and 101. The potentiometer is adjusted so that the voltage applied to the control electrode of valve 100 through the thermistor 54 is normally insufficient to render the valve or transistor conductive, but upon a drop in ambient temperature to around freezing or below, the increase in resistance of thermistor 54 provides sufficient voltage at the control electrode to render the valve conductive.

One terminal of the output or collector circuit of valve 100 is connected to the power lead 88 by lead 102, and the other terminal is connected through a low impedance resistance 106 to the input terminal of an amplifier 108 which again preferably comprises a simple PNP transistor. A high impedance resistance 110 also connects the second output terminal of valve 100 to power lead 90 to apply a suitable potential to such terminal. A lead 112 connects the output circuit of amplifier 108 to the energizing coil 114 of a relay 116 through the output circuit of a second electronic valve-amplifier 118, also preferably comprising a PNP transistor. A lead 120 connects the other terminal of the output circuit of amplifier 108 to power lead 88, and a lead 122 connects the other terminal of relay coil 114 to the power lead 90. The three transistors 100, 108 and 118 thus provide a cascaded valve-amplifier system for energizing the coil 114 of relay 116 when both the valve 100 and the valve 118 are triggered to a conductive condition. The relay 116 controls the operation of the main power relay 16 through the normally open contacts 124 and lead wires 126.

The second valve 118 is triggered to a conductive and non-conductive condition by the moisture sensor 60. For this purpose, the control or base electrode of transistor valve 118 is connected to the power lead 88 through a resistor 128 and to the power lead 90 through a resistor 130 arranged in series with the normally open electrodes or screen-like grids 70 of moisture sensor 60. Lead wires 132 and 134 passing through cable 20 connect the sensor 60 in detector unit 30 in series with the resistance 130 as shown in FIG. 5. The impedance of resistances 128 and 130 and the direction of current flow through the rectifier 92 are such that the conduction of current through valve 118 is blocked, i.e., the valve is rendered non-conductive, so long as, or whenever, the control circuit for the valve is open at the control electrodes 70. However, when the electrodes 70 are shorted or rendered conductive by the passage and accumulation of water therebetween, a proper voltage is applied to the control element of valve 118 to render the valve conductive.

As above stated, in the preferred and illustrated embodiment of the invention, the detector unit housing the sensors and funnel heater, and the control unit housing the remainder of the control system comprise separate units 30 and 18, respectively, whereby most of the control system can be located in a protected location such as the interior of a garage, basement or the like. In FIG. 5, therefore, those portions of the system contained in the detector unit 30 are enclosed in a rectangle 136, and those portions of the system contained in the control unit 18 are enclosed by a rectangle 138. It will be apparent, however, that the entire control system could be contained within the housing of the detector unit, particularly if the system is used with a remotely positioned exposed surface, such as the reflector of a radio telescope or the like. As an example, the several elements of the electrical system of FIG. 5 may have the following values: transformer 80, 115–12.6 volts; condenser 94, 100 mfd., 25 v.; potentiometer 96, 25K; resistance 106, 220 ohms; resistance 110, 10K; resistance 128, 10K; and resistance 130, 100K. Each of the electronic valves 100, 118 and 128 may be a conventional 2N1303 transistor.

The operation of the detector and control system will be evident from the foregoing description. If the outside or ambient temperature is above freezing and the weather clear, heater thermostat 48 will be open, funnel heater 46 disconnected, and valves 100 and 118 maintained non-conductive. If rain falls but the temperature remains above freezing, valve 118 will be triggered to a conductive condition by moisture sensor 60 although no current will flow to relay coil 114 because valve 100 is still blocked or non-conductive, and heater 46 will remain inoperative since thermostat 48 is set to close only when the ambient temperature is 32-35° F. or below. Should the temperature drop to around freezing or below but the weather remain clear, heater 46 will become operative and valve 100 will be triggered to a conductive condition by temperature sensor 52, although flow of current to relay coil 114 will be blocked by valve 118. Under any of these conditions, therefore, control relay 116 will remain open and main relay 16 will not be operated to turn on the heating means 10. Upon both a drop in ambient temperature to freezing or below and the collection or accumulation of snow or ice forming moisture on funnel 40, heater 46 will be energized to melt the ice or snow. When this occurs, both valves 100 and 118 will be triggered or rendered conductive by sensors 52 and 60 to cause operation of relay 116, thereby operating main relay 16 to effect operation of heating means 10. Upon cessation of any or all of the above conditions causing operation of relay 116, either valve 100 or valve 118, or both, will be triggered or rendered non-conductive, and relay coil 114 will be de-energized to turn off heating means 10 through relays 116 and 16. As above stated, thermostat 48 will be set to open its contacts and disconnect funnel heater 46 at a temperature of 55°-65° F.

FIG. 6 shows a sensor generally similar to FIG. 4 except that wire rings 168 may be used which can be connected to leads 72, 74. The rings are carried in annular ring 62 of sensor 60.

The present invention thus provides a relatively simple, rugged and inexpensive detector and system for detecting ice or snow accumulating or collecting on an exposed surface and for effecting operation of a heating means for removing or preventing such accumulation. While a preferred embodiment of the invention has been illustrated and described, it will be apparent that various modifications and equivalents other than those above mentioned may be made or utilized, and it is intended to be limited only by the scope of the appended claims.

What is claimed is:

1. In a system for detecting an accumulation of ice and snow and controlling the operation of a heating means for removing the same from an exposed surface, the combination of a relay for controlling the operation of said heating means, a first sensor responsive to ambient temperature, a second sensor responsive to accumulation of moisture, a pair of electronic valves, electrical circuit means for triggering one of said valves into conductive and non-conductive condition in response to operation of one of said sensors, the second of said valves and said relay being connected in the conductive path of said first valve, and circuit means for triggering said second valve into conductive and non-conductive condition in response to operation of the other of said sensors, whereby said relay is energized upon triggering both said valves into conductive condition and is de-energized upon triggering either valve into non-conductive condition.

2. A system as set forth in claim 1 in which each of said electronic valves comprises a transistor.

3. A system as set forth in claim 1 in which an electronic amplifier is connected in the conductive circuit between said first and second valves.

4. A system as set forth in claim 3 in which said amplifier and said valves each comprise a transistor.

5. A system as set forth in claim 1 in which said moisture responsive sensor comprises a pair of spaced metallic screens interwoven into nylon-like net material and arranged in substantially horizontal parallel planes.

6. A system as set forth in claim 1 in which said moisture responsive sensor comprises a pair of spaced metallic screens arranged in substantially horizontal parallel planes, and said temperature sensor comprises a thermistor.

7. A system as set forth in claim 6 in which said thermistor is enclosed in a protective housing open at its upper end, a metallic funnel-shaped member is supported in the upper portion of said housing, and said metallic screens are supported in the stem portion of said funnel member.

8. A system as set forth in claim 1 in which said temperature sensor comprises a thermistor enclosed in a protective housing open at its upper end, a metallic funnel-shaped member is supported in the upper portion of said housing, a heater means for melting ice and snow is operatively associated with said funnel member, a thermostat for controlling said heating means is mounted in said housing and connected to a power source in parallel with said relay and said valves, and said moisture responsive sensor comprises a pair of spaced metallic screens supported in substantially horizontal parallel planes within the stem portion of said funnel member.

9. A system as set forth in claim 8 in which said moisture responsive sensor comprises a pair of metallic screens interwoven into nylon-like net material.

10. A detector unit for use in a system for effecting removal of ice or snow accumulating on an exposed surface comprising a protective housing open at its top and provided with an opening for the drainage of moisture in its bottom, a funnel-shaped member mounted in said housing and having a portion for collecting ice and snow exposed through the open top of the housing and a stem portion communicating with said bottom opening, a heating means for melting ice and snow operatively associated with the collecting portion of said funnel member, thermostatic means for controlling said heating means positioned within said housing, a sensor responsive to ambient temperatures mounted in said housing, a pair of spaced horizontally disposed metallic screen-like electrodes mounted in said stem portion of the funnel member and electrically insulated from said stem portion and from each other, electrical conductors for said electrodes, said sensor and said heating means extending to a second opening provided in said housing, and a body of electrically insulating heat-conducting material filling the space between said housing and said funnel-shaped member.

11. A system as set forth in claim 1 in which the moisture responsive sensor comprises a pair of spaced metallic wire rings arranged in substantially horizontal parallel planes.

References Cited

UNITED STATES PATENTS

| | | | |
|---|---|---|---|
| 2,717,957 | 9/1955 | Ohlheiser | 340—234 X |
| 2,787,695 | 4/1957 | Dyke | 219—200 |
| 3,157,800 | 11/1964 | Burwell | 340—234 X |
| 3,164,820 | 1/1965 | Hulett | 340—234 |

RICHARD M. WOOD, *Primary Examiner.*

C. L. ALBRITTON, *Assistant Examiner.*